United States Patent [19]

Kawakatsu

[11] Patent Number: 5,142,197
[45] Date of Patent: Aug. 25, 1992

[54] LIGHT INTERFERENCE FILM AND LAMP
[75] Inventor: Akira Kawakatsu, Yokohama, Japan
[73] Assignee: Toshiba Lighting & Technology Corporation, Tokyo, Japan
[21] Appl. No.: 673,002
[22] Filed: Mar. 21, 1991
[30] Foreign Application Priority Data Mar. 23, 1990 [JP] Japan .................................. 2-74907

[51] Int. Cl.⁵ .......................... H01J 61/35; G02B 5/28
[52] U.S. Cl. .................................... 313/635; 313/112; 359/586; 359/588
[58] Field of Search ................ 313/112, 635; 359/586, 359/588

[56] References Cited

U.S. PATENT DOCUMENTS 4,701,663 10/1987 Kawakatsu ........................ 313/112
4,839,553 6/1989 Mellor .............................. 313/112

Primary Examiner—Donald J. Yusko
Assistant Examiner—Diab Hamadi
Attorney, Agent, or Firm—Foley & Lardner

[57] ABSTRACT

An automotive lamp comprises a glass bulb having a filament and a light interference film formed on the surface of the glass bulb. The light interference film has a high-refractive index layer and a low-refractive index layer alternately stacked on each other. Each layer has a refractive index $n_i$ and a thickness $d_i$, wherein i is equal to 1, 2, ... k. In this case, $n_i d_i$ is equal to $(1 \pm 0.025)n_2 d_2$, wherein i is equal to $3 \sim (k-1)$, $n_1 d_1$ is equal to $(1 \pm 0.025)n_2 d_2$, and $n_k d_k$ is equal to $(1 \pm 0.025)n_2 d_2$. The maximum value of the reflectance of the film is more than 91% within visible light range, and the 50% transmitting wavelength is from 515 nm to 542 nm.

2 Claims, 6 Drawing Sheets

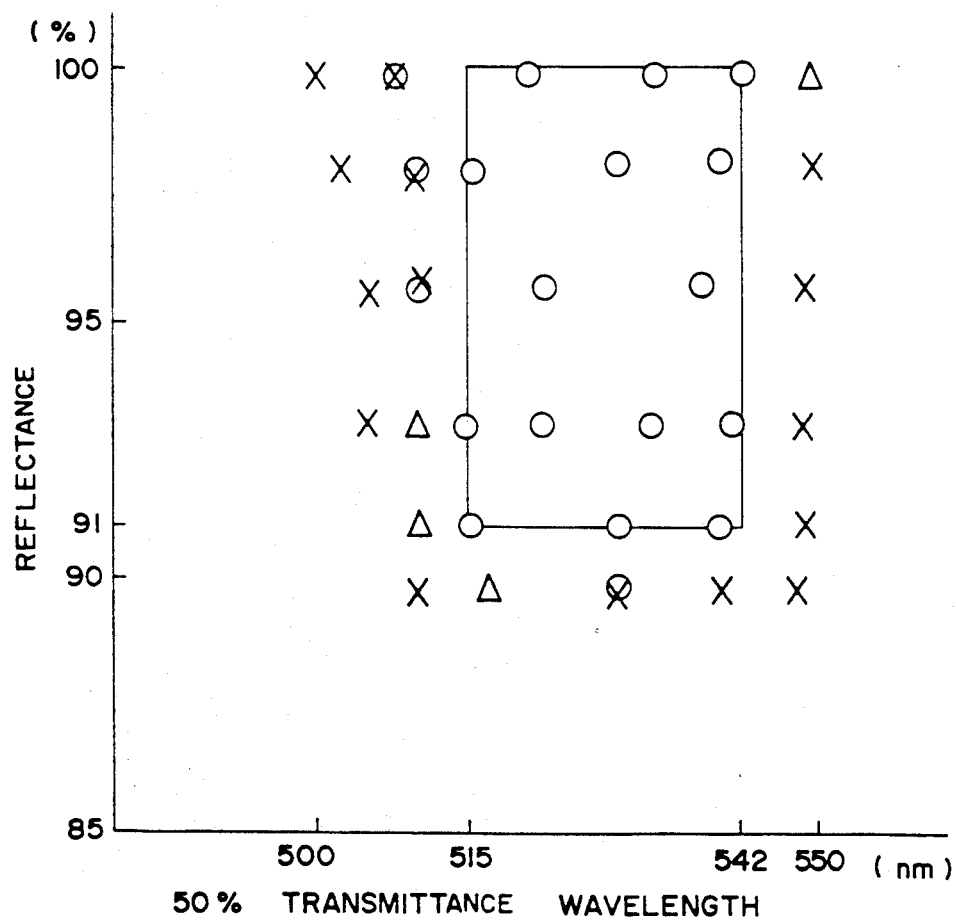
F I G. 6

LIGHT INTERFERENCE FILM AND LAMP

BACKGROUND OF THE INVENTION

The present invention relates to a light interference film which selectively transmits or reflects light of a desirable wavelength range, and especially transmits yellow light, and a lamp using the light interference film.

In a recently proposed halogen lamp having a glass bulb, an infrared ray reflecting film through which visible light passes is formed on the glass bulb within which a filament is provided. Amongst the light emitted by the filament, infrared rays are reflected from the infrared ray reflecting film and returned to the filament. Thus, the infrared rays reflected from the reflecting film heats the filament and the emitting efficiency is improved. At the same time, the amount of infrared rays transmitted outside the lamp is reduced.

Such an infrared ray reflecting film is formed by alternately stacking high-refractive index layers of titanium oxide ($TiO_2$) or the like and low-refractive index layers of silicon oxide ($SiO_2$) or the like. The infrared ray reflecting film consists of more than 5-7 layers.

This type of film is called a light interference film. The application of the light interference film in order to obtain desirable wavelength light such as yellow light has been studied.

In general, the light interference film comprises odd layers whose optical thickness nd (n = refractive index, d = thickness) = $\lambda_0$, and odd layers whose optical thickness nd = $(\frac{1}{4})\lambda_0$ stacked alternately. This light interference film is called $(\frac{1}{4})\lambda$ film, and $\lambda_0$ corresponds to a maximum reflectance.

Otherwise, the light interference film is formed by stacking another low-refractive layers (nd = $(\frac{1}{8})\lambda_0$) having a half thickness thereof so that the transmittance may be even. Furthermore, layers whose nd = $(\frac{1}{2})\lambda_0$ or layers whose nd = $(\frac{1}{8})\lambda_0$ are appropriately inserted to the stacked layers, so that the transmittance and the reflectance of the light interference film may be adjusted.

As to the lamp having the light interference film, it has been studied that the wavelength range less than 500 nm is reflected from the film and the wavelength range more than 500 nm is transmitted through the film in order to obtain yellow light. However, it is actually difficult to form such a light interference film.

Furthermore, in general, the light interference film has an incident angle dependency, accordingly as the incident angle with respect to the light interference film leaves from 0°, a transmission characteristic is shifted toward a short wavelength side and the reflectance characteristic is reduced.

SUMMARY OF THE INVENTION

It is an object of the present invention to provide a light interference film and a lamp in which the transmission light of a desirable wavelength range, namely yellow light may be easily obtained without considering the effect of incident angle dependence.

The foregoing object is accomplished by providing a light interference film which includes a high-refractive index layer and a low-refractive index layer alternately stacked on each other; each layer having a refractive index $n_i$ and a thickness $d_i$, wherein i is equal to 1, 2, ... k; $n_i d_i$ being equal to $(1 \pm 0.025) n_2 d_2$, wherein i is equal to 3~(k-1); $n_1 d_1$ being equal to $(1 \pm 0.025) n_2 d_2 / 2$; and $n_k d_k$ being equal to $(1 \pm 0.025) n_2 d_2 / 2$.

In the light interference film the maximum value of the reflectance of the film is more than 91% within the visible light range, and the 50% transmittance wavelength is from 515 nm to 542 nm.

According to another aspect of the invention there is provided a lamp which includes a glass bulb having a filament therein; a light interference film formed on the surface of the glass bulb and having a high-refractive index layer and a low-refractive index layer alternately stacked on each other; each layer having a refractive index $n_i$ and a thickness $d_i$, wherein i is equal to 1, 2, ... k; $n_i d_i$ being equal to $(1 \pm 0.025) n_2 d_2$, wherein i is equal to 3~(k-1); $n_1 d_1$ being equal to $(1 \pm 0.025) n_2 d_2$; and $n_k d_k$ being equal to $(1 \pm 0.025) n_2 d_2$.

According to another aspect of the present invention, a light interference film includes a high-refractive index layer and a low refractive index layer alternately stacked on each other; each layer having a refractive index $n_i$ and a thickness $d_i$, wherein i is equal to 1, 2, ... k;

$n_i d_i$ being equal to $(1 \pm 0.025) n_2 d_2$, wherein i is equal to 3~(k-1);

$n_1 d_1$ being equal to $(1 \pm 0.025) n_2 d_2 / 2$; and $n_k d_k$ being equal to $(1 \pm 0.025) n_2 d_2 / 2$.

Therefore, the maximum value of the reflectance and the 50% transmittance wavelength of this film may be easily changed by changing the value of $n_i d_i$ mentioned above.

Furthermore, when the maximum value of the reflectance of the film is more than 91%, and the 50% transmittance wavelength thereof is from 515 nm to 542 nm, the transmission of light through the film of a desirable wavelength range, namely yellow light may be easily obtained. The yellow light may be obtained without considering the effect of the incident angle dependency.

The preferred embodiments of the present invention will become understood from the following detailed description referring to the accompanying drawings.

BRIEF DESCRIPTION OF THE DRAWINGS

FIG. 6 is a diagram showing a condition where a chromatic of transmission light from the light interference film is within a yellow light range of JIS for an automobile.

DETAILED DESCRIPTION OF THE PREFERRED EMBODIMENTS

An embodiment of the light interference film of the present invention which is applied to an automotive halogen lamp (fog lamp) will become understood from the following detailed description referring to the accompanying drawings, FIGS. 1-7.

Figure 1:
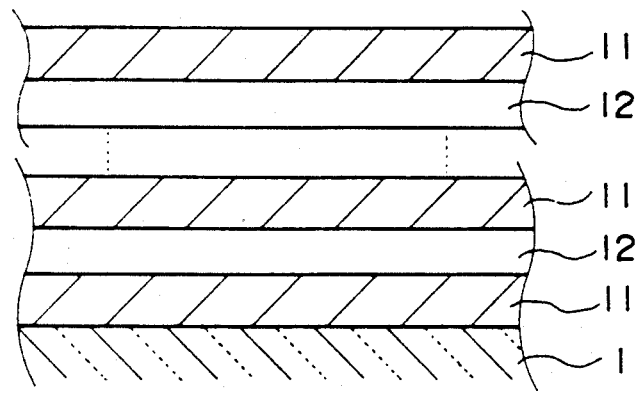
FIG. 1 is a sectional side view showing a structure of a light interference film according to the present invention.
Figure 2:
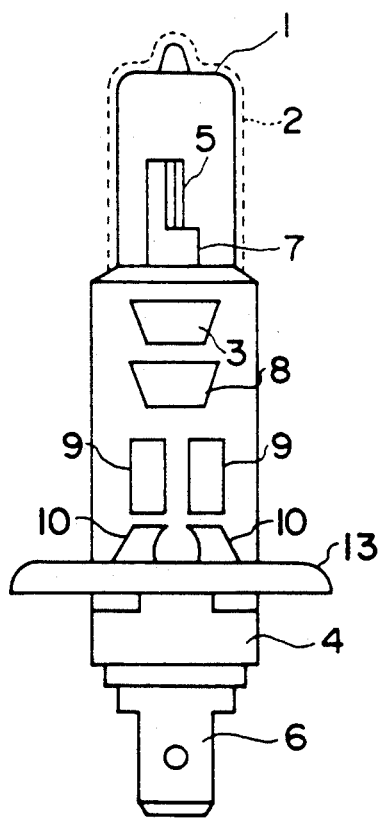
FIG. 2 is a schematic side view of a halogen lamp according to the present invention.

In FIG. 2, reference numeral 1 indicates a glass bulb made of quartz glass, aluminosilicate glass or the like. Reference numeral 2 indicates the light interference film which is formed on at least one surface of the inner surface and the outer surface of the glass bulb 1, for example on the outer surface. The light interference film transmits light having the yellow light wavelength range of JIS (Japanese Industrial Standard) shown in FIG. 7. Reference numeral 3 indicates a sealing portion formed by crushing and sealing the end portion of the glass bulb 1 and reference numeral 8 indicates a metallic piece for holding the sealing portion 3. A base 4 having holes 9 is mounted at the sealing portion 3, the base 4 is constructed so as to engage with a socket (not shown). Reference numeral 13 indicated a metallic flange and reference numeral 10 indicates a metallic piece which is integrated with the metallic flange. A connection terminal 6 is secured to the base 4, so that an electric current is sent to a filament 5 through a conductor 7.

An inlet gas such as argon gas and a halogen gas are filled within the glass bulb 1.

The light interference film 2 on the glass bulb 1 consists of high-refractive index layers 11 of titanium oxide ($TiO_2$) or the like and low-refractive index layers 12 of silicon oxide ($SiO_2$) or the like. The high-refractive index layers 11 and the low-refractive index layers 12 are alternately stacked on each other.

When the refractive index of each layer (11, 12) of the light interference film 2 is $n_i$ and the thickness of each layer is $d_i$ ($i = 1, 2, \ldots k$), the optical thickness of the first layer from the glass bulb 1 is $n_1 d_1$ and the optical thickness of the second layer is $n_2 d_2$ and the optical thickness of the kth layer is $n_k d_k$.

In this embodiment, on the basis of the optical thickness $n_2 d_2$ of the second layer, the optical thickness $n_1 d_1$ of the first layer is $(1 \pm 0.025) n_2 d_2 / 2$, the optical thicknesses $n_i d_i$ of the third layer ~ the (k-1)th layer are $(1 \pm 0.025) n_2 d_2$, the optical thickness $n_k d_k$ of the kth layer is $(1 \pm 0.025) n_2 d_2 / 2$. The light interference film 2 is constructed in this way.

A method of forming the light interference film 2 will be described as follows. First, an organic titanium compound such as tetraisopropyl titanate is dissolved in an organic solvent, so that a titanium solution is prepared whose titanium content is 2-10% and whose viscosity is 2.0 cps. Next, an organic silicon compound such as ethylsilicate is dissolved in an organic solvent, so that a silicon solution is prepared whose silicon content is 2-10% and whose viscosity is 1.0 cps.

The sealed automotive halogen lamp is immersed in the titanium solution in an atmosphere of fixed temperature and humidity. After the lamp is pulled at a constant speed, it is dried and baked at about 600° C. in air for about 5 minutes. By baking it, the high-refractive index layer 11 of titanium oxide ($TiO_2$) is formed. The halogen lamp having the high-refractive index layer 11 is immersed in the silicon solution. After the lamp is pulled at a constant speed, it is dried and baked at about 600° C. in air for about 5 minutes again. By baking it, a low-refractive index layer 12 of silicon oxide ($SiO_2$) is formed on the high-refractive index layer 11. By repeating these steps, the light interference film 2 is formed.

The maximum value of the reflectance of the light interference film 2 within the visible light range is determined to be over 91%, and the 50% transmittance wavelength is determined to be the wavelength range from 515 nm to 542 nm. The transmittance for the wavelength range over 600 nm is over 85%.

The wavelength of the maximum value of the reflectance may be changed and matched with a desirable wavelength range, for example the yellow light wavelength range in this embodiment, by changing the optical thicknesses of the high-refractive index layers 11 of titanium oxide and the low-refractive index layers 12 of silicon oxide.

The refractive indexes $n_i$ ($i = 1, 3, \ldots$) of the high-refractive index layers 11 are more than 2.0, and the refractive indexes $n_i$ ($i = 2, 4, \ldots$) of the low-refractive index layers 12 are less than 1.6. Tantalum oxide, zirconium oxide, zinc sulfide, and the like may be used for the material of the high-refractive index layer instead of titanium oxide.

Another medium or low-refractive index layer whose optical thickness is $(1 \pm 0.025) n_2 d_2 / 2$, may be inserted between the first layer of the light interference film 2 and the glass bulb 1.

The maximum value of the reflectance of the light interference film 2 may be changed, by changing the difference between the refractive indexes of the high-refractive index layer 11 of titanium oxide and the low-refractive index layer 12 of silicon oxide and by changing the number of the total layers (the total number of the high and low refractive index layers).

In general, the transmission light through the light interference film 2 has an incident angle dependency, however in this embodiment the incident angle dependency of the light interference film 2 is reduced.

Figure 7:
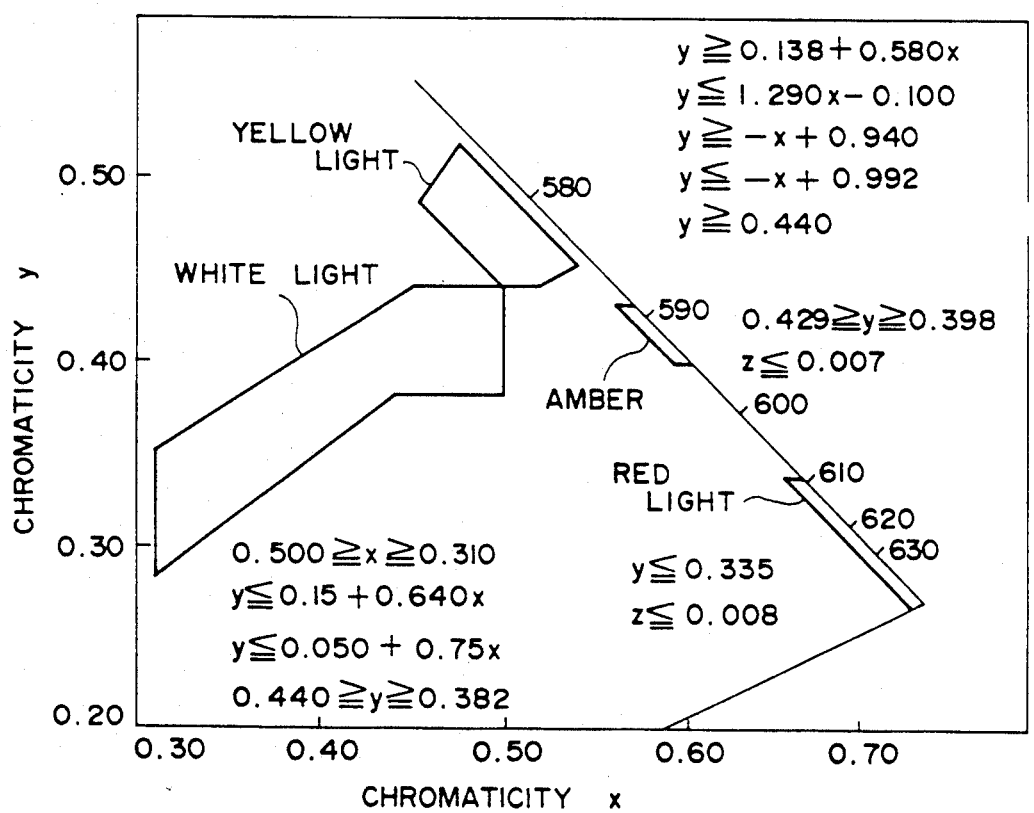
FIG. 7 is a diagram showing a chromaticity range for automotive lighting equipment.

In this embodiment, as to (a) a chromaticity change according to a 50% transmittance wavelength change, (b) a chromaticity change according to a maximum reflectance change, (c) a chromaticity change according to a change of an incident angle dependence, and (d) a condition where the chromaticity in (a), (b), (c) is within the yellow light wavelength range of JIS shown in FIG. 7, several experiments were performed in order to investigate them.

Figure 3:
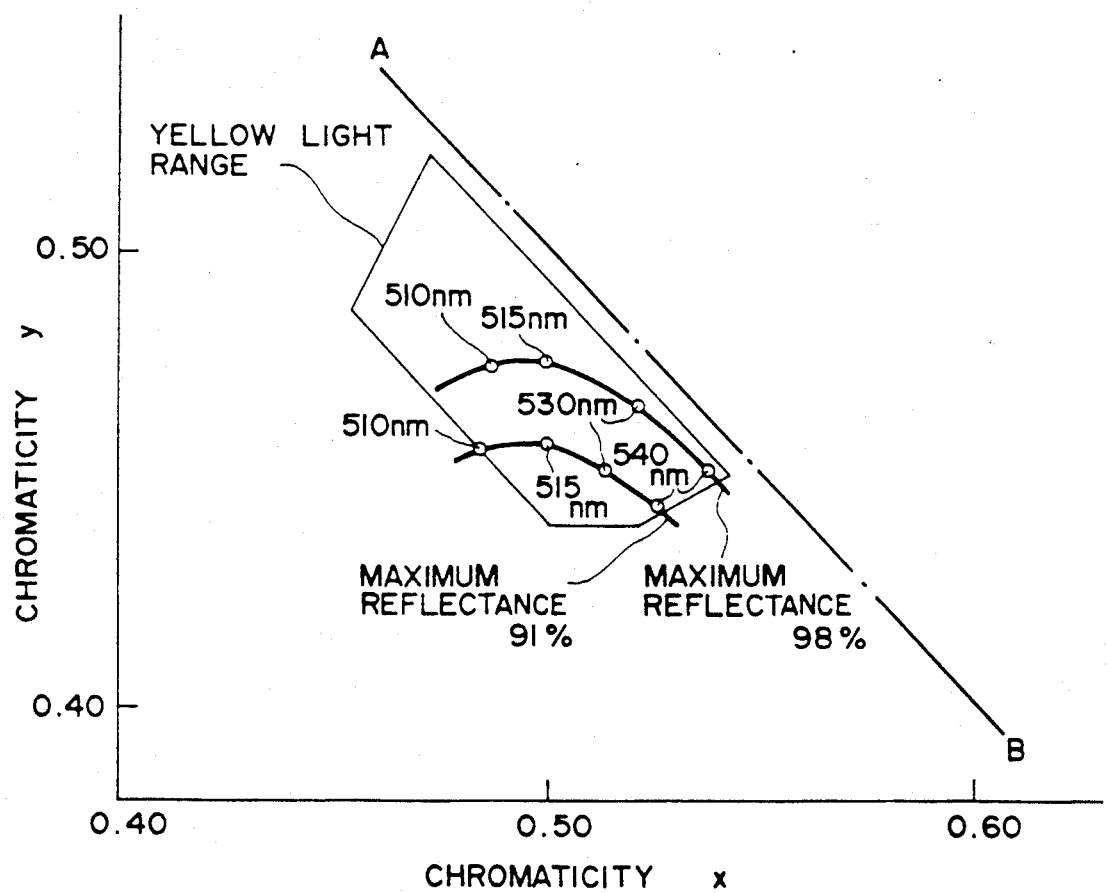
FIG. 3 is a chromaticity diagram showing a chromaticity change according to a 50% transmittance wavelength change and a maximum reflectance change of the light interference film.

First, as to (a), the thicknesses of the odd numbered high-refractive index layers from the glass bulb 1, for example, the thicknesses of the 11th layer and the 15th layer were changed so as to change the 50% transmittance wavelength. (For example, as the 50% transmittance wavelength is shifted towards the short wavelength side, the chromaticity x is shifted toward the small side shown in FIG. 3). The chromaticity in the direction perpendicular to the filament 5 (the direction perpendicular to the central axis of the filament) was measured, and the measured result is shown in FIG. 3. The experimental shrinkage of the luminous flux of the light interference film 2 was less than 5-15%, and it is less than a half of that of yellow colored glass (the shrinkage of the luminous flux thereof is 30%). Almost all the luminous flux of the halogen lamp itself may be maintained.

Figure 4:
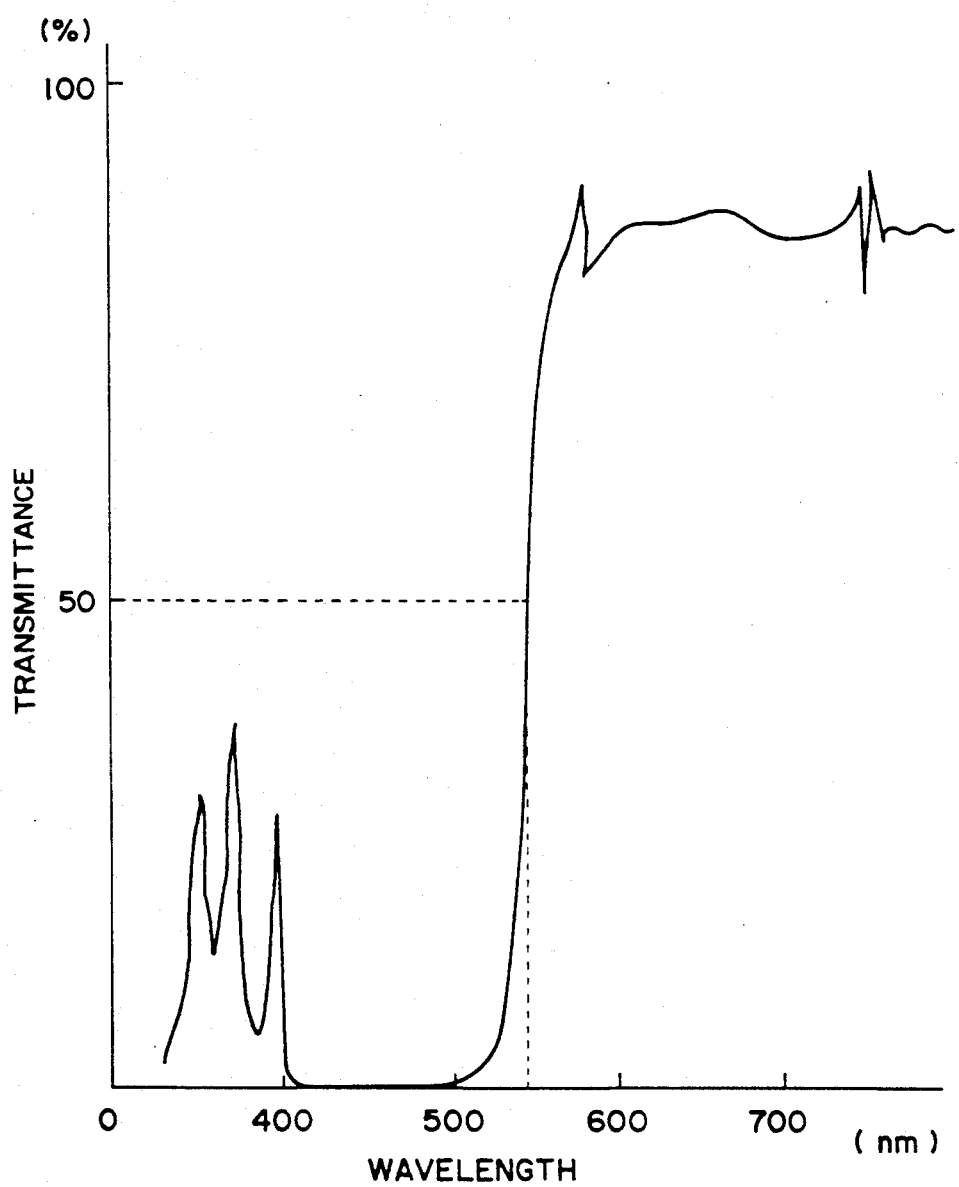
FIG. 4 is a diagram showing the transmission characteristic of the light interference film.

Next, as to (b), the chromaticity is shifted in the direction far from the line AB shown in FIG. 3, as the maximum reflectance is getting small. FIG. 4 shows the transmittance characteristic for this case. In FIG. 4, when the 50% transmittance wavelength is adjusted to 542 nm by changing the thickness of the 15th layer, the transmittance with respect to the wavelength more than 600 nm is about 90%. The transmittance characteristic shown in FIG. 4 is satisfactory.

As to (c), in general the light interference film has the incident angle dependence with respect to a transmission characteristic. That is, when the incident angle $\theta$ is getting large, the chromaticity is shifted in the direction far from the line AB. Therefore, when the chromaticity of the direction perpendicular to the filament (incident angle $\theta=0$) exists around the left and bottom border line of the yellow light range the chromaticity is likely to leave the yellow light range as shown in FIG. 7 even if the incident angle $\theta$ is a little large. In this case, it is difficult to use the light interference film as an automotive one.

Furthermore, as to (d), the condition where the chromaticity in the direction perpendicular to the filament is within the yellow light wavelength range of JIS in the case of changing the maximum reflectance and the 50% transmittance wavelength, was measured. This measured result is shown in FIG. 6.

Figure 5A:
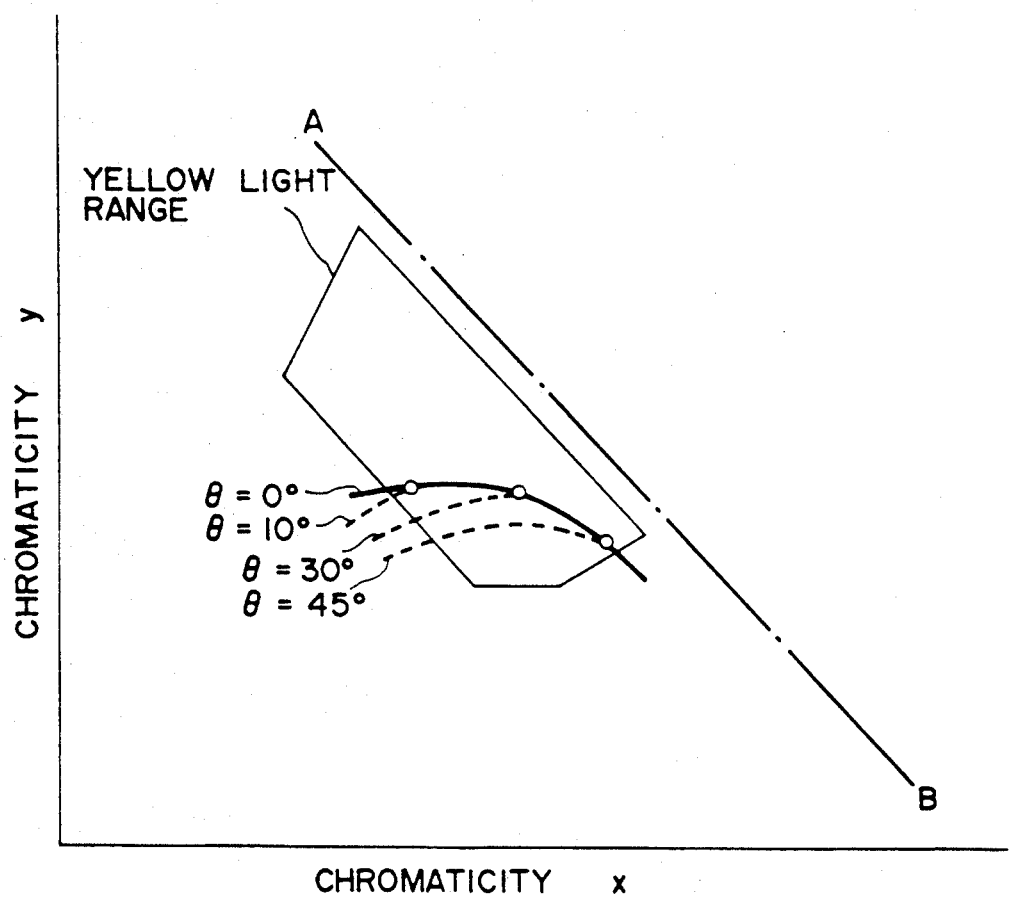
FIG. 5A is a chromaticity diagram showing a chromaticity change according to a change of an incident angle dependence.
Figure 5B:
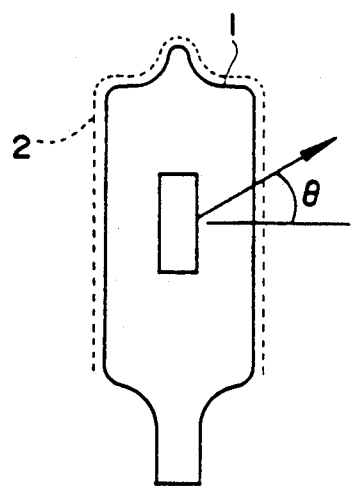
FIG. 5B is a schematic side view of the halogen lamp showing an incident angle.

The light interference film according to the present invention is useful as an automotive one, even if the incidence angle $\theta$ (the angle $\theta$ with respect to the direction perpendicular to the filament in FIG. 5B) is around 45°.

In this embodiment, (a) the chromaticity change according to the 50% transmittance wavelength change, (b) the chromaticity change according to the maximum reflectance change, and (c) the chromaticity change according to the change of the incident angle dependence, are adjusted so that the chromaticity is within the yellow light range of JIS. However (a), (b) and (c) mentioned above may be adjusted so that the chromaticity is within another desirable range.

What is claimed is:

1. A lamp comprising:
   a glass bulb having a filament therein;
   a light interference film formed on the surface of the glass bulb, the light interference film including a high-refractive index layer and a low-refractive index layer alternately stacked on each other and having a maximum value of a reflectance and a 50% transmittance wavelength;
   each layer having a refractive index $n_i$ and a thickness $d_i$, wherein i is equal to 1, 2, ... k;
   $n_i d_i$ being equal to $(1 \pm 0.025) n_2 d_2$, when i is equal to $3 \sim (k-1)$;
   $n_1 d_1$ being equal to $(1 \pm 0.025) n_2 d_2 / 2$; and
   $n_k d_k$ being equal to $(1 \pm 0.025) n_2 d_2 / 2$;
   the maximum value of reflectance of the film being more than 91% within the visible light range; and
   the 50% transmittance wavelength being from 515 nm to 542 nm.

2. A lamp as set forth in claim 1, wherein a first layer of the film is a high-refractive index layer.

* * * * *